Oct. 20, 1925.
J. A. CHARTER
1,558,238
VENT VALVE FOR ENGINES
Filed April 14, 1924
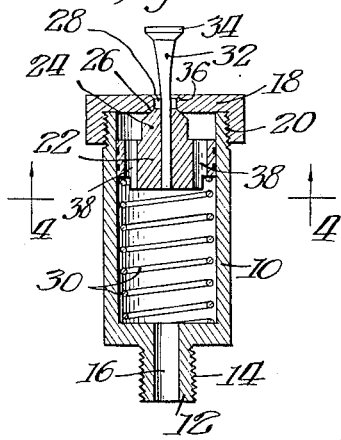
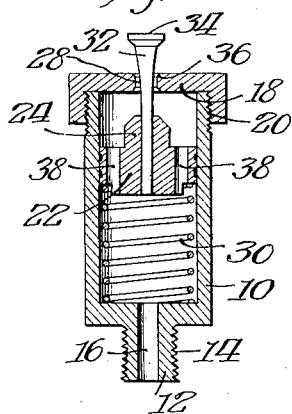
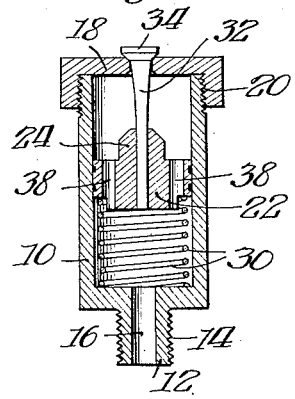
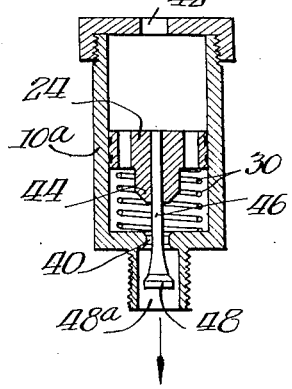
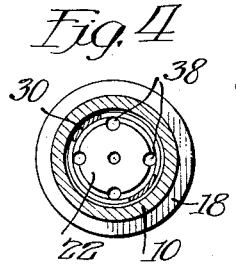
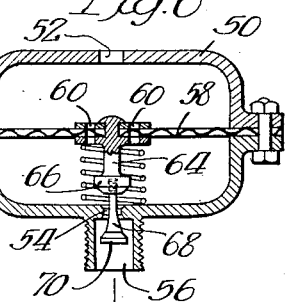
Inventor:
James A. Charter,
By Cheever & Cox
Attys.

Patented Oct. 20, 1925.

1,558,238

UNITED STATES PATENT OFFICE.

JAMES A. CHARTER, OF CHICAGO, ILLINOIS.

VENT VALVE FOR ENGINES.

Application filed April 14, 1924. Serial No. 706,619.

*To all whom it may concern:*

Be it known that I, JAMES A. CHARTER, a citizen of the United States, residing at Chicago, in the county of Cook and State of Illinois, have invented a certain new and useful Improvement in Vent Valves for Engines, of which the following is a specification.

It is well understood in the automobile art that it is desirable as the internal combustion automobile engine speeds up to break the vacuum in the manifold by introducing between the carbureter and the engine a limited amount of air, thereby saving gasoline. This invention is an automatic vent valve for use under this condition which is automatically closed in two different positions: one, by the action of a spring; and the other by the pull of the vacuum of the engine, and which is in intermediate position open for the passage of air for the purpose above set forth.

The object of the invention is to provide a mechanism of this kind which can be easily and cheaply constructed and installed, which is satisfactory in use; is not readily liable to get out of order. The invention consists in mechanism for attaining the foregoing and other objects; which will be hereafter more fully set forth in the specification and claims.

Referring to the drawings in which like numerals designate the same parts throughout the several views:

Figures 1, 2 and 3 are sectional, central, elevations of mechanism illustrating this invention, with the operative parts in different positions.

Figure 4 is an inverted plan view on the line 4—4 of Figure 1.

Figure 5 is an alternative form of construction in which the valve mechanism is differently placed.

Figure 6 is another alternative construction in which a diaphragm is substituted for the piston of Figures 1–5.

In the preferred construction, a cylindrical case 10 is provided, having extending from its bottom a stem 12 provided with screw threads 14 engageable with a suitable opening in the engine manifold, there being through this extension 12 an air port 16 communicating with the engine manifold and with the interior of cylinder 10 when the device is applied to the automobile engine. The upper end of the cylinder 10 is closed by a conventional cap 18 detachably secured in place by any suitable means as, for instance, screw threads 20. Reciprocal inside cylinder 10 is a piston 22 carrying at its upper end a valve plug 24 seating at 26 on the rim of an air port 28 in cap 18 and adapted, in the position of Figure 1, to so close that port that no air can pass through the port. Piston 22, carrying valve member 24, is normally urged to this closed position, as shown in Figure 1, by a suitable spring 30 occupying the lower interior portion of cylinder 10. Rigidly secured to and extending from the upper end of valve member 24 is a long slender valve stem 32, substantially smaller than piston 24, preferably of Venturi shape, carrying at its extreme upper end a valve head 34 adapted, when the parts are in the position of Figure 3, to engage a valve seat 36 on the upper end of port 28 and prevent the passage of air through the port. The valve stem 32 is made sufficiently smaller than the port 28 so that in intermediate positions between those of Figures 1 and 3, there is always sufficient space between the stem 32 and the walls of port 28 so that some air can pass through the port 28, the volume of such air increasing—due to the shape of the Venturi stem 32—as the valve and stem approach the position of Figure 1, and the length of the conical face of the stem 32 is made so much longer than the length of port 28 that varying sizes of effective opening through the port are created at each successive intermediate position of the stem through the port.

The piston 22 is provided with a plurality of comparatively small perforations 38 which allow air to pass from port 28 through the piston to passage 16 and vice versa. These perforations 38 are not, however, of sufficient size to materially reduce the effective size of the piston 22, with the result that any vacuum pull created by the manifold of an engine exerted through passage 16 serves to pull the piston and attached parts downward toward and to the position of Figure 3, substantially as effectively as though the passages 38 were not present.

In the operation of the preferred construction, the mechanism is installed as heretofore described with the passage 16 in communication with the vacuum created within the engine manifold. When the engine is not running and there is substantially no vacuum in the manifold, spring 30, which because of the large size of piston 22 in comparison with port 28 is large enough to be proportioned or calibrated to the work required, causes the valve parts to assume the position of Figure 1 with the result that no air can enter passage 28. This spring is of sufficient tension so that it holds the valve mechanism in this condition until the engine has started and attained a substantial speed, such as its idling speed for example. When this condition is reached, the suction produced by the manifold through passage 16 becomes sufficient to almost instantly shift the piston 22 from the position of Figure 1 through the position of Figure 2 to that of Figure 3 in which the valve head 34 engages valve seat 36 and closes port 28 so that again no air can pass through port 28 and passages 38 and 16 into the manifold. Attention is called to the fact that the slim taper of stem 32 and its relation to port 28 is such that as the parts travel from the position of Fig. 3 to that of Fig. 2, the flow of air downward through ports 28 and 38 is so graduated that it enters the engine manifold in proper proportion to the load on the engine to prevent the mixture suddenly becoming lean and thus causing the common flash back or explosion in the carbureter of the engine. This shape of stem 32 is absolutely necessary to the production of an instrument which effectively prevents such flash back. As the operator of the engine now opens the damper in the carbureter for the purpose of speeding up the engine, thereby reducing the vacuum in the manifold, the pull on the piston 22 becomes slightly less and the piston therefore under the action of spring 30 moves up part way from the position of Figure 3 to that of Figure 1 or, say, to the position of Figure 2, thereby admitting outside air through port 28, ports 38, and passage 16 to the engine manifold thus reducing the vacuum in the manifold and, under well known principles, increasing the efficiency of the engine, this latter due to less gasoline being drawn through the carbureter by the weakened vacuum.

If the operator continues opening the carbureter butterfly damper to the maximum, thereby lowering the vacuum in the manifold to its lowest point, the spring 30 is so proportioned that it then restores the valve mechanism to the position of Figure 1. thus shutting off the air through port 28 and preventing interference of the device with the full normal capacity operation of the carbureter.

If the preferred form of device is so placed that the valve head 34 can be seen by the operator, said head serves as a visible indicator of the correct functioning of the engine. That is to say, the operator can tell whether air is being excluded entirely as shown in Figures 1 and 3 or is being bled in as shown in Figure 2.

If, for any reason, it is undesirable to have the valve head 34 projecting as shown in Figures 1–3 and serving as an indicator as just described, the construction of Figure 5 may be employed, in which an air controlled passage 40, corresponding to port 28, is introduced at the bottom of cylinder 10$^a$, a plain air passage 42 is substituted for port 28 and the valve mechanism of Figures 1–3 is simply reversed with a valve member 44, corresponding to 24, seating on the upper side of port 40, the same carrying a downwardly extending valve stem 46, carrying a valve head 48 seating on the lower side of port 40. The operation of this alternative construction is substantially identical with that of the preferred construction, it being understood that valve head 48 closes passage 40 under the action of spring 30 and valve 44 is seated under the pull of vacuum through passage 48 and port 40.

In the second alternative construction of Figure 6, cylinder 10 is replaced by diaphragm chamber 50, having at some convenient point, as, for instance, its upper side, a convenient air port 52, and in its bottom an air passage 54, communicating with the interior of chamber 50 and through extension pipe 56 with the engine manifold. Across the interior of chamber 50 is a diaphragm 58 of conventional construction, having through it at any convenient point several small ports 60, corresponding to ports 38 heretofore described; the result may be increased by placing at one side of the diaphragm a groove 62. The diaphragm 58 carries a valve stem 64, carrying at its lower portion a valve block 66 closely resembling member 44 and seating on the upper side of port 54. Projecting from the lower side of member 66 is a Venturi valve member 68 carrying at its lower end a valve head 70 seating on the lower side of port 54 just as valve head 48 does on port 40 of Figure 5. The operation of the structure of Figure 6 is substantially that of Figure 5, the diaphragm 58 providing the guided movement for the upper end of the valve mechanism, just as piston 24 of Figure 5 does for the valve mechanism 44—48 of the structure of that figure. The structure of Figure 6 has the slight advantage that the diaphragm does away with any wall friction which may occur in the structure of Figure 5 between the piston and the cylinder.

Having thus described my invention, what I claim as new and desire to secure by Letters Patent is:

1. In mechanism of the class described, a chamber having an end wall having a port therethrough, a long, slender, conical valve stem of less cross-section than the port, reciprocal through the port, separate means on the stem on opposite sides of the wall capable of independently closing the port, a perforated member movable in the chamber carrying the valve stem, spring mechanism normally urging the perforated member to such position that one of the port closing means closes the port, means applying suction apparatus to the chamber whereby vacuum created by it in the chamber moves the piston against the action of the spring until the second closing means closes the port, the two closing means being sufficiently separated so that intermediate between the two positions described, air is sucked through said port and the chamber.

2. In mechanism of the class described, a wall having a port therethrough, a long Venturi shaped valve stem of less cross-section than the port reciprocal through the port, separate means on the stem on opposite sides of the wall capable of independently closing the port, spring mechanism urging one of the port closing means to close the port, means applying vacuum creating apparatus to move by vacuum the valve stem against the action of the spring until the second closing means closes the port, the two closing means being sufficiently separated so that intermediate between the two positions described, air is sucked through said port and the wall.

3. In mechanism of the class described, a closed cylinder having at one point an air intake port and at another a passage adapted for connection with an engine manifold, a long, slender, conical valve stem operating through said port and of less than its cross-sectional area, carrying separated means closing the port in two different positions of the stem, a perforated piston movable in the cylinder carrying the valve stem, spring mechanism urging the perforated piston to such position that one of the port closing means normally closes the port, the parts being so positioned that suction of an engine manifold exerted through said passage moves the piston against the action of the spring until the second closing means closes the port, the two closing means being sufficiently separated so that intermediate between the two positions described, air is sucked through said port and the cylinder to the engine manifold.

In witness whereof, I have hereunto subscribed my name.

JAMES A. CHARTER.